United States Patent [19]

Spigarelli

[11] 4,348,174

[45] Sep. 7, 1982

[54] METHOD AND APPARATUS FOR VAPOR CONSERVATION AND CONTROL

[75] Inventor: Donald J. Spigarelli, Carlisle, Mass.

[73] Assignee: Hybrid Technology Corporation, Concord, Mass.

[21] Appl. No.: 228,613

[22] Filed: Jan. 22, 1981

[51] Int. Cl.³ .................. F26B 3/00; F27B 15/00; F26B 21/06; F28D 13/00

[52] U.S. Cl. .......................................... 432/1; 34/27; 34/78; 165/104.11; 432/197; 432/210

[58] Field of Search .................... 432/1, 197, 210, 13; 228/180 R; 134/107; 165/104.11 A; 34/27, 77, 78

[56] References Cited

U.S. PATENT DOCUMENTS

| | | | |
|---|---|---|---|
| 1,110,788 | 9/1914 | Hultgren | 34/78 X |
| 4,012,847 | 3/1977 | Rand | 34/77 |
| 4,261,111 | 4/1981 | Rand | 34/78 |
| 4,264,299 | 4/1981 | Ammann | 432/13 |

*Primary Examiner*—John J. Camby
*Attorney, Agent, or Firm*—Weingarten, Schurgin & Gagnebin

[57] ABSTRACT

A method and apparatus for vapor conservation and control for use with vapor phase soldering, degreasing, or similar systems having a tank into which work is introduced and removed. The air present above the processing vapor zone is drawn from the processing tank and cooled to condense the vapor, and the remaining air is then returned to the tank above the area of withdrawal. A negative pressure is preferably created at the tank entrance such that air flow is into the tank to prevent emission of vapor and pollutants from the tank into the atmosphere.

18 Claims, 3 Drawing Figures

METHOD AND APPARATUS FOR VAPOR CONSERVATION AND CONTROL

FIELD OF THE INVENTION

This invention relates to vapor phase soldering, degreasing, and like systems and more particularly to a method and apparatus for conservation and emission control of a processing vapor within such systems.

BACKGROUND OF THE INVENTION

Vapor phase systems are known in which a processing vapor is provided in a vessel and into which a product is introduced to accomplish a particular process or operation. One such system is known for vapor phase soldering wherein solder on a workpiece is caused to melt or reflow by the heat from a condensing heated vapor. In such a vapor phase soldering system, a fluorocarbon or other suitable liquid is provided in a tank and is heated to a temperature sufficient to produce a hot saturated vapor above the surface of the liquid and in equilibrium therewith. This liquid preferably is a non-conducting chemically stable inert liquid having an atmospheric boiling point slightly above the soldering temperature and which provides non-oxidizing, non-flammable vapor. The tank is usually open to the atmosphere to facilitate product entry and removal, and the vapor can emanate from the open tank into the atmospere. The release of process vapor into the atmosphere can present a health risk, and the presence and magnitude of such emissions are becoming the subject of increasingly stringent government and industry health and safety standards. Moreover, the liquid providing the vapor can be relatively expensive, and thus for economy of system operation, loss of the liquid through vapor emission into the atmosphere should also be minimized.

One technique for minimizing vapor loss is shown in U.S. Pat. No. 3,904,102 wherein a secondary vapor blanket is provided over the primary or processing vapor to shield the primary vapor from the atmosphere. The secondary vapor blanket is most typically formed of Freon TF (R-113) which stratifies between the primary vapor and the atmosphere by virtue of a lower boiling point and a lower density than the primary vapor. Such a dual vapor system presents several disadvantages. The system is inherently more complex than single vapor systems by reason of the additional cooling and recovery equipment required for the second fluid. The secondary vapor is not in contact with its own boiling phase but rather is exposed to the higher temperature primary vapor; thus, the secondary vapor is caused to exist at a superheated temperature, usually about 180°–225° F., which causes breakdown of the material into components which can be toxic and corrosive. In the case of Freon TF, gases can form and combine with water to produce hydrochloric and hydrofluoric acids, which can affect the processing system and add to the cost of its maintenance. Such acid contaminants exist in the second vapor to some degree even when employing acid removal procedures on the condensed secondary liquid. The presence of Freon TF may also promote degradation of the primary fluid. Moreover, the boiling phase of the primary liquid can generate pollutants such as perfluoroisobutylene (PFIB) which can enter the atmosphere.

Systems have been proposed using tank covers to contain the processing vapor, however, vapor loss still occurs when the cover is opened to admit product entry and removal. An improved system for minimizing the problems of vapor loss is shown in U.S. Pat. No. 4,077,467 of the same inventor and assignee as herein. In the system therein described, the primary and secondary liquids are separated and contained within closed individually controlled vapor-lock chambers. The separate chambers minimize vapor communication therebetween, inhibit the flow of contaminants, minimize vapor loss, and avoid fluid breakdown due to excessive heating of the secondary liquid. The separation of the chambers is achieved by movable doors which sequentially open to admit the work and close behind the work; after the soldering is completed, the doors operate in reverse sequence.

SUMMARY OF THE INVENTION

The system according to the present invention eliminates the use of secondary vapor blankets and achieves conservation of the primary vapor in an open vapor-phase soldering, degreasing, or other vapor processing system by controlled recirculation and cooling of the vapor-laden air. The air with some vapor diffused therein which is present above the layer of saturated primary vapor is drawn from the processing tank and cooled to condense the primary vapor from the withdrawn air, and is then returned to the tank above the layer where air was withdrawn.

In presently preferred embodiment, the air above the primary vapor zone is withdrawn through a first plenum chamber by an exhaust fan or other negative pressure device, and this air with the entrained primary vapor is drawn through a heat exchanger wherein the air is cooled and some of the primary vapor is condensed. The condensed vapor may be drained from the heat exchanger for recovery and reuse. The cooled air is then returned to the tank through a second plenum chamber disposed in the tank above the first plenum chamber and below the opening by which work enters and leaves the tank. The returning air has significantly less entrained primary vapor than the withdrawn air. Further, the temperature of the returning air is less than the temperature of the extracted air, thus the difference in density aids to reduce thermal updrafts, preventing loss of vapor entrained in the air mass above the primary vapor zone.

In an alternative embodiment, some of the recirculated air is vented, creating a negative pressure at the entrance to the process tank to insure that air is always flowing into the tank entrance such that no potentially toxic or polluting materials flow out into the atmosphere. A treatment chamber or other device may be inserted into the air recirculation path to cause removal of by-products from the air volume prior to exhausting air into the atmosphere or return of cooled air to the tank. Such treatment can be accomplished typically by hydrolyzation, by chemical reaction, or through filtering.

DESCRIPTION OF THE DRAWINGS

The invention will be more fully understood from the following detailed description and the accompanying drawings, wherein.

DETAILED DESCRIPTION OF THE INVENTION

Figure 1:
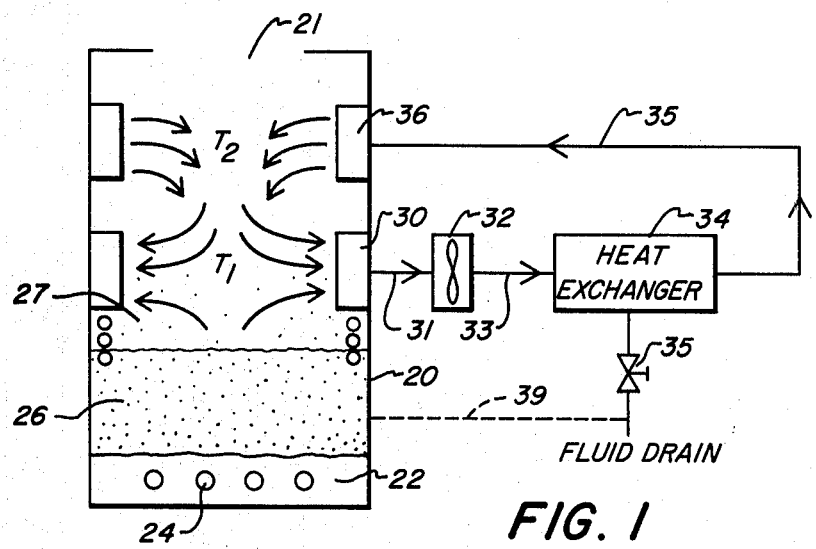
FIG. 1 is a schematic representation of a vapor phase system embodying the invention.

Turning to the drawings and FIG. 1 in particular, there is shown a vapor control system for use with a process tank 20 having an opening 21 for product entry and removal, and a fluid 22 heated by submerged heaters 24 to produce a vapor zone 26. Cooling coils 27 are provided about the inner wall of tank 20 at a height to define the upper level of the vapor zone 26. A plenum or exhaust duct 30 is located above the zone 26 and through which air and vapor diffused therein is drawn by an exhaust fan 32 in air channel 31. The fan 32 exhausts the vapor and air along air path 33 to a heat exchanger 34. The heat exchanger 34 condenses some of the vapor in the exhausted air into a liquid which may be drained by means of a valve 50 for collection or for recirculation via a path 39 to tank 20. The air and any remaining vapor from the heat exchanger is returned to the tank through an intake or plenum 36 along recirculation path 35. The returning air has significantly less entrained vapor and further, the temperature $T_2$ of the returning air is less than the temperature $T_1$ of the extracted air; thus there is a difference in density which helps to reduce thermal updrafts and prevent loss of vapor entrained in the air mass above the primary vapor zone. By appropriate control of flow of air and vapor through the intake and exhaust plenums 36 and 30, respectively, turbulence is minimized and an equilibrium condition can be maintained wherein the vapor loss to the atmosphere will be minimized.

Figure 2:
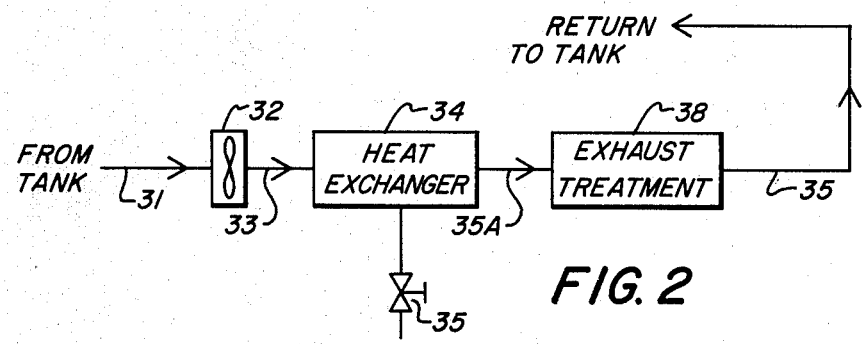
FIG. 2 is a schematic representation showing the addition of a filter to the air recirculation path of the embodiment of FIG. 1.

FIG. 2 shows the air recirculation path of the system FIG. 1 further including an exhaust treatment chamber 38. The chambers 38 is shown connected to the heat exchanger 34 by an air conduit 35A, and exhausts back into the intake plenum along the air path 35. This chamber is operative to remove unwanted components in the vapor to prevent or minimize their emission into the atmosphere. The chamber 38 can perform the reduction or elimination of the pollutants by filtering such as with activated carbon, or by chemical reaction or other means.

Figure 3:
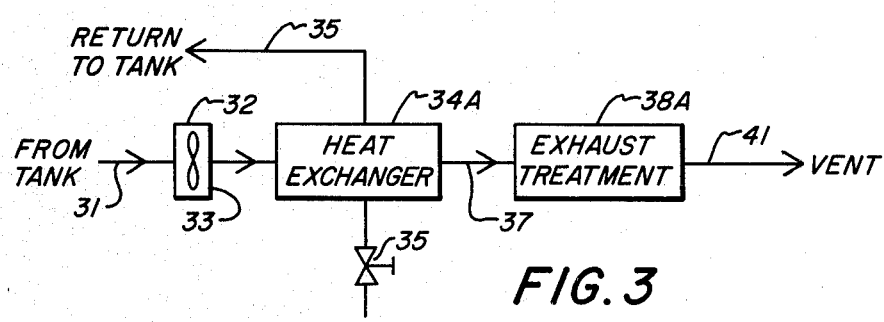
FIG. 3 is a schematic representation of another embodiment of the invention which includes an auxillary treatment chamber and an exhaust in the air recirculation path.

A further embodiment of the invention is shown in FIG. 3 and includes an additional air path 37 from the heat exchanger 34A. The heat exchanger 34A is essentially the same as the heat exchanger 34 shown in of FIG. 1, with an additional exit path 37. The path 37 may exhaust directly to the atmosphere, but is preferably connected to an exhaust treatment chamber 38A operative to remove unwanted byproducts and residual vapors prior to exhaust to the atmosphere. The exhaust treatment can be by filtering, chemical reaction, or the like. The deprivation of air from the returning path 35 causes the volume within the tank 20 to have less air than it did previously, creating a negative pressure and causing air to move into the tank through the opening 21. As work is introduced into the vapor zone 26 through the tank opening 21, the external air will also enter, restricting if not eliminating the passage of vapor to the atmosphere through the opening 21. By insuring that room air is always flowing into the tank, no potentially toxic nor expensive materials will flow out, and any effluent present in the tank can be treated in the recirculation path, as described, for removal of toxic byproducts and recovery of fluid.

While the above discussion describes the invention according to presently preferred embodiments, it is understood that this description is made only by way of example and is not intended to limit the scope of the invention. Other modifications and embodiments are contemplated. For example, the exhaust and return ducts can be mounted on a separate vessel which is disposed on and in communication with the process tank. Moreover, the invention can also be employed with a covered process tank to control emissions when the cover is opened or closed. Accordingly, the invention is not to be limted except as indicated in the accompanying claims.

What is claimed is:

1. For use in a vapor phase processing system having a vessel containing a process vapor substantially within a processing vapor zone, the upper level of said processing vapor zone defined by the location of first cooling means, and an opening by which a work product is introduced into and removed from the processing vapor zone, a vapor control system comprising:

exhaust means disposed above the processing vapor zone and below said opening for exhausting air and vapor from said vessel which is present above the processing zone;

means coupled to the exhaust means for extracting at least some vapor from the exhausted air; and means disposed above the exhaust means and below said opening for returning the exhausted air and any remaining vapor to said vessel at a position above that of the exhaust means and below the vessel opening.

2. The vapor control system of claim 1 wherein said exhaust means includes:

means having at least one exhaust opening in said vessel above said processing vapor zone and below the vessel opening;

an exhaust path coupled to said at least one exhaust opening; and an exhaust fan which provides a negative pressure at said at least one exhaust opening.

3. The vapor control system of claim 2 wherein said exhaust means includes a plenum disposed on said vessel above said processing vapor zone and below the vessel opening.

4. The vapor control system of claim 2 wherein said exhaust means includes second cooling means for cooling the exhausted air to condense the vapor therein.

5. The vapor control system of claim 4 wherein said second cooling means is in the exhaust path.

6. The vapor control system of claim 2 including means in the exhaust path for removing predetermined pollutants from the exhausted air.

7. The vapor control system of claim 1 wherein said returning means includes means for venting a portion of the exhausted air to the atmosphere to cause a negative pressure at the vessel opening.

8. For use in a vapor phase processing system having a vessel containing a processing vapor substantially within a processing vapor zone, the upper level of said processing vapor zone defined by the location of first cooling means and an opening by which a work prodcut is introduced into and removed from the processing vapor zone, a method for control of said vapor comprising the steps of:

providing a processing vapor in a processing vapor zone in the vessel disposed in the bottom section of the vessel;

providing a zone in the vessel above the processing vapor zone and below the vessel opening;

exhaust from said vessel at a position above the processing vapor zone and below the opening, air and vapor in the zone above the processing vapor zone;

removing from the exhausted air and vapor at least some of the vapor present; and returning the exhausted air after removal of an amount of vapor to the vessel in the zone above the processing vapor zone and at a position above that at which air and vapor is exhausted.

9. The method of claim 8 wherein said removing step includes condensing the vapor from the exhausted air.

10. The method of claim 9 wherein said removing step further includes removing unwanted components from the exhausted air and vapor.

11. The method of claim 9 further including venting at least some of the exhausted air prior to returning the exhausted air to the vessel to cause a negative pressure at the vessel opening.

12. The method of claim 11 including returning at least some of the condensed vapor to said vessel.

13. A vapor phase processing system comprising:

a vessel for containing a quantity of a primary liquid and an opening by which a work product is introduced into and removed from the vessel;

heating means in the vessel for heating the primary liquid to form a zone of processing vapor in the vessel;

cooling means in the vessel and disposed above the heating means and operative to cause cooling of some of the processing vapor and to define the extent of the processing vapor zone;

exhaust means in the vessel disposed above the processing vapor zone and below the vessel opening;

return means disposed in the vessel above the exhaust means and below the vessel opening;

a recirculation path coupling the exhaust means to the return means and including:

means for drawing air and vapor from the vessel through the exhaust means;

means for removing at least some of the vapor present in the exhausted air; and means for returning the exhausted air after removal of the vapor to the return means for re-entry into the vessel.

14. The system of claim 13 including:

means for venting a portion of the exhausted air to the atmosphere to cause a negative pressure at the vessel opening and entry of air into the vessel via the vessel opening.

15. The system of claim 14 wherein said removing means includes means for condensing at least some of the vapor in the exhausted air; and means for returning the condensed vapor to the vessel.

16. A vapor phase processing system comprising:

a vessel having an open top by which a work product is introduced into and removed from the vessel, a processing zone in a lower portion of the vessel and a second zone above and in open communication with the processing zone and below the open top;

heating means in the vessel for heating a primary liquid contained in the vessel to provide processing vapor in the processing zone;

cooling means in the vessel and disposed above the heating means at the upper level of the processing zone, the cooling means being operative to cause cooling of some of the processing vapor in the processing zone and to define the extent of the processing zone;

exhaust means in the second zone of the vessel including one or more exhaust ports in the wall of the vessel disposed above the processing vapor zone and below said open top for exhausting air and vapor from said vessel which is present above the processing zone;

return means in the second zone of the vessel including one or more return ports in the wall of the vessel disposed above the exhaust ports and below said open top for returning the exhausted air and any remaining vapor to said vessel at a position above that of the exhaust ports and below said open top;

a recirculation path coupling the one or more exhaust ports of the exhaust means to the one or more return ports of the return means, the recirculation path including:

means for drawing air and vapor into the exhaust ports from the second zone of the vessel;

means for removing at least some of the vapor present in the exhausted air; and means for returning the exhausted air after removal of the vapor to the return ports for return to the second zone of the vessel.

17. The system of claim 16 wherein the recirculation path includes:

means for cooling the exhausted air from the second zone of the vessel to condense the vapor therein;

and wherein the means for returning the exhausted air is operative to return the cooled air to the second zone of the vessel;

the cooled air returned to the second zone having a lower vapor content and lower temperature than the vapor content and temperature of the air exhausted from the second zone.

18. The system of claim 17 wherein the recirculation path includes means for venting a portion of the air exhausted from the second zone of the vessel to cause a negative pressure at the open top of the vessel to cause flow of air from the atmosphere into the vessel and to minimize the flow of air and vapor in the vessel out to the atmosphere.

* * * * *